(12) United States Patent
Chun et al.

(10) Patent No.: US 7,835,260 B2
(45) Date of Patent: Nov. 16, 2010

(54) METHOD FOR RECEIVING SIGNALS IN MULTIPLE USER SYSTEM

(75) Inventors: Jin Young Chun, Seoul (KR); Jae Won Chang, Gyeonggi-do (KR); Jin Hyuk Jung, Gyeonggi-do (KR); Moon Il Lee, Gyeonggi-do (KR); Bin Chul Ihm, Gyeonggi-do (KR); Wook Bong Lee, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/298,219

(22) PCT Filed: Apr. 20, 2007

(86) PCT No.: PCT/KR2007/001934

§ 371 (c)(1),
(2), (4) Date: Mar. 2, 2009

(87) PCT Pub. No.: WO2007/123336

PCT Pub. Date: Nov. 1, 2007

(65) Prior Publication Data

US 2010/0061222 A1    Mar. 11, 2010

(30) Foreign Application Priority Data

Apr. 24, 2006    (KR) .................... 10-2006-0036722

(51) Int. Cl.
*H04J 11/00* (2006.01)

(52) U.S. Cl. ....................................... 370/203; 370/328
(58) Field of Classification Search ................ 370/320, 370/203, 328; 375/267, 342, 260
See application file for complete search history.

(56) References Cited

U.S. PATENT DOCUMENTS

| 4,905,221 | A  | * | 2/1990 | Ichiyoshi ..................... 370/320 |
| 6,987,819 | B2 | * | 1/2006 | Thomas et al. .............. 375/342 |
| 2005/0141631 | A1 |  | 6/2005 | Takano |
| 2007/0064830 | A1 | * | 3/2007 | Choi et al. .................. 375/267 |

FOREIGN PATENT DOCUMENTS

EP    1146660    10/2001

\* cited by examiner

*Primary Examiner*—Derrick W Ferris
*Assistant Examiner*—Gbemileke Onamuti
(74) *Attorney, Agent, or Firm*—Lee, Hong, Degerman, Kang & Waimey

(57) ABSTRACT

This document is related to a method for receiving signals in multi-user system, the method comprising: receiving signals form 2 or more mobile stations using 'k'-th radio resource and 'k+m'-th radio resource; estimating a channel matrix using the received signals; calculating a weight matrix so that the channel matrix have an orthogonality to the signals from each of the mobile stations; transmitting the weight matrix to each of the mobile stations; and receiving signals that the weight matrix is applied by each of the mobile stations. By doing so, we can increase the transmission efficiency through obtaining both orthogonality and diversity gain in the multi-user MIMO system.

3 Claims, 2 Drawing Sheets

[Fig. 1]
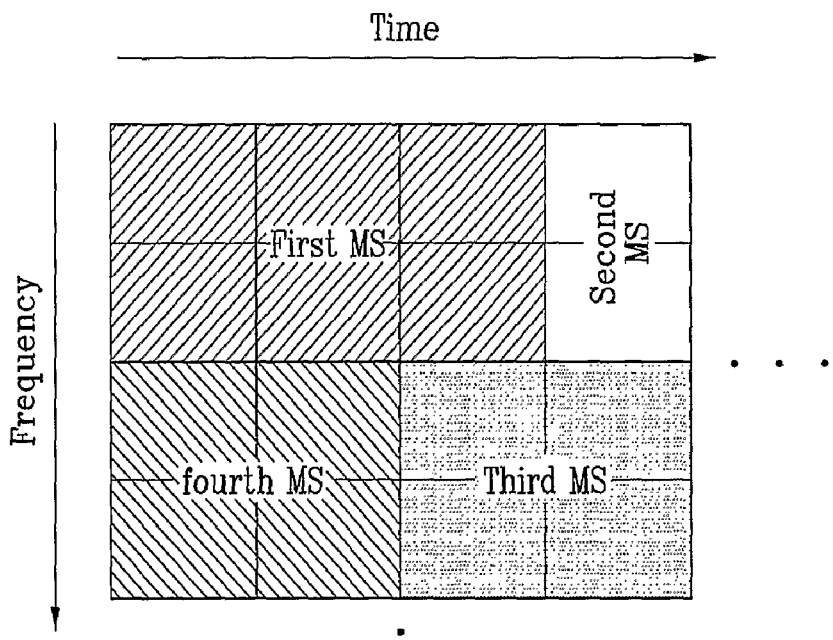
[Fig. 2]
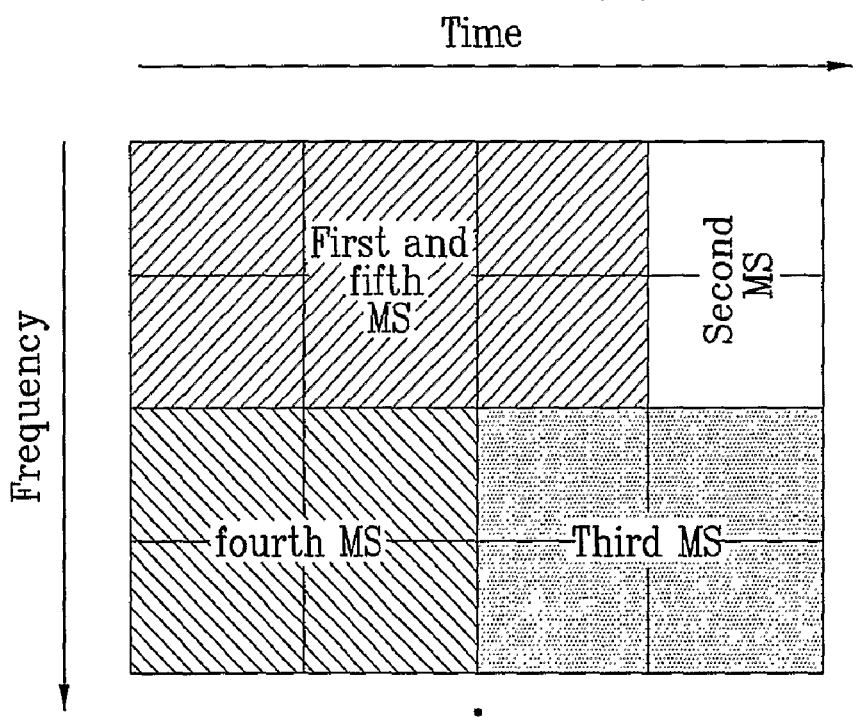

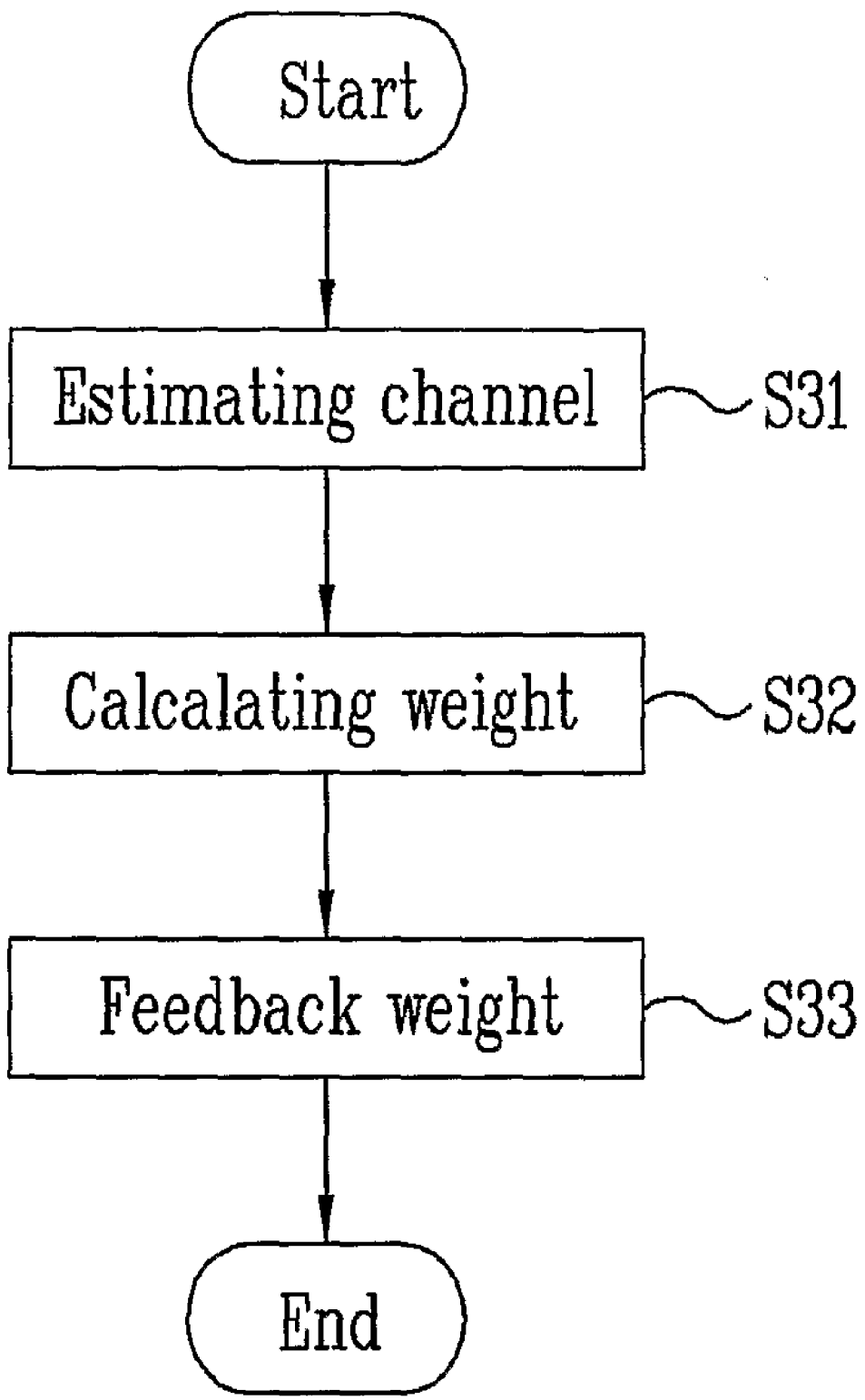
[Fig. 3]

METHOD FOR RECEIVING SIGNALS IN MULTIPLE USER SYSTEM

CROSS-REFERENCE TO RELATED APPLICATIONS

This application is a 371 U.S. national stage application of international application PCT/KR2007/001934, filed on Apr. 20, 2007, which claims priority to Korean application 10-2006-0036722, filed on Apr. 24, 2006, the contents of which are hereby incorporated by reference herein in their entirety.

TECHNICAL FIELD

This document relates to a method for receiving signals in multi-user system, and more particularly to a method for increasing transmission efficiency by making the signals transmitted from 2 or more mobile terminals have orthogonality from each other.

BACKGROUND ART

Generally, in an uplink transmission, a mobile station (hereinafter "MS") use the radio resources allocated by the base station (hereinafter "BS") as designated. This system can be called as a single-user system. For example, in the Time Division Multiple access (TDMA) system, certain time interval is allocated to each of the MSs, and the allocated time interval can be used by the allocated MS as designated. On the other hand, in the Code Division Multiple Access (CDMA) system, different codes are allocated to each of the MSs, and each of the MSs use the allocated code as designated. In this case, one code that can be called as one radio resource can be used only one user.

FIG. 1 is an illustrative figure that shows an example of the radio resource allocated to MSs in multi-carrier system. As shown in the FIG. 1, in the multi-carrier system, radio resources in the map consisting of a time axis and a frequency axis can be allocated to each of the MSs, and each of the MSs can use the allocated radio resource as designated.

FIG. 2 is an illustrative figure that shows another example of the radio resource allocated to MSs in multi-carrier system. As shown in the FIG. 2, the same radio resource in the map consisting of a time axis and a frequency axis can be allocated to and shared by 2 or more MSs, and this system is called as multi-user system.

Table 1 is an example that represents a method for transmitting signals by each of the MSs in the multi-user system.

TABLE 1

| MS 1 | $S_1$ |
|------|-------|
| MS 2 | $S_2$ |

As in the table 1, when each of the MSs transmits signals as in the single user-system, and base station receives two signals at once, the data rate becomes doubled, and theoretical transmission rate also becomes doubled. But, there is a problem of increasing error rate in the receiving side.

Table 2 is another example that represents a method for transmitting signals by each of the MSs in the multi-user system.

TABLE 2

| MS 1 | $S_1$ | $S_1$ |
|------|-------|-------|
| MS 2 | $S_2$ | $-S_2$ |

When transmitting as in the table 2, each of the MSs repeats same signal twice and transmits on the time axis or on the frequency axis. Instead of sharing the same radio resource, each of the MSs transmits the same signal repeated twice, so the data rate becomes 1 as in the single-user system. Here, the signals of the two MSs, that is repeated twice, is configured to have an orthogonality to each other, so they don't give interference to each other MS. According to this transmission method, although the data rate is reduced in half for transmitting the signal repeated twice, it can make up for the low performance in the low Signal to Noise Ratio (SNR) environment. Moreover, because orthogonality can be maintained for each of the data, the signals can be easily decoupled.

In the prior multi-user multi-input multi-output system, orthogonality can be obtained by the method as in the table 2, but there is a problem that it can't obtain the diversity gain because transmitting signals repeated on the neighboring time axis or frequency axis.

DISCLOSURE OF INVENTION

Technical Problem

Accordingly, the present invention is directed to increase transmission efficiency by making each of the signals transmitted by 2 or more MSs have orthogonality to each other, in the multi-user system.

Technical Solution

To achieve these objects and other advantages of the present invention, a method for receiving signals in multi-user system, the method comprising: receiving signals form 2 or more mobile stations using 'k'-th radio resource and 'k+m'-th radio resource; estimating a channel matrix using the received signals; calculating a weight matrix so that the channel matrix have orthogonality to the signals from each of the mobile stations; transmitting the weight matrix to each of the mobile stations; and receiving signals that the weight matrix is applied by each of the mobile stations.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is an illustrative figure that shows an example of the radio resource allocated to MSs in multi-carrier system;

FIG. 2 is an illustrative figure that shows an another example of the radio resource allocated to MSs in multi-carrier system; and FIG. 3 is a flow chart that shows an example of a method for transmitting signals using weight value.

BEST MODE FOR CARRYING OUT THE INVENTION

Reference will now be made in detail to the preferred embodiments of the present invention, examples of which are illustrated in the accompanying drawings.

According to one embodiment of the present invention, to obtain both orthogonality and diversity gain, a method is directed to transmit the repeated signals separated in a certain distance on the time axis or the frequency axis for obtaining diversity gain, and multiply the weight values to the signals to be transmitted by receiving feedback information regarding channel value for obtaining orthogonality.

An example of the case that two MSs having one antenna are allocated the same radio resource, and a base station having one antenna transmits signals is as follows. First, the signals received at base station can be represented as follows.

$$\begin{bmatrix} r_k \\ r_{k+1} \end{bmatrix} = \begin{bmatrix} h_{1,k} & h_{2,k} \\ h_{1,k+1} & -h_{2,k+1} \end{bmatrix} \begin{bmatrix} s_1 \\ s_2 \end{bmatrix} + \begin{bmatrix} n_k \\ n_{k+1} \end{bmatrix} \quad \text{Math Figure 1}$$

In the Math Figure 1, r represents the received signal, h represents the channel value, $s_1, s_2$ represent transmitted signals form each of the MSs, n represents an Additive White Gaussian Noise (hereinafter "AWGN"). And "k", "k+1" represent an index on the time axis or frequency axis.

When the signals are transmitted as in the Math Figure 1, because the signals are transmitted using neighboring time or frequency, the channel value is almost the same, so they can have orthogonality. But, two signals transmitted from the same MS experience almost the same channel, so diversity gain can't be obtained.

That is, for channel matrix H, it can have orthogonality when $H^H H$ is calculated and the other terms except the diagonal terms are 0. And, when H has orthogonality, the two signals don't work as an interference signal, and each signals can be easily detected by decoupling.

Following Math Figure 2 is for showing orthogonality for the Math Figure 1.

$$H^T H = \begin{bmatrix} h_{1,k}^* & h_{1,k+1}^* \\ h_{2,k}^* & -h_{2,k+1}^* \end{bmatrix} \begin{bmatrix} h_{1,k} & h_{2,k} \\ h_{1,k+1} & -h_{2,k+1} \end{bmatrix} \quad \text{Math Figure 2}$$

$$\cong \begin{bmatrix} 2|h_{1,k}|^2 & 0 \\ 0 & 2|h_{2,k}|^2 \end{bmatrix}$$

In the Math Figure 1, if $h_{1,k}=h_{1,k+1}, h_{2,k}=h_{2,k+1}$ the matrix that has 0 value in the other terms except diagonal terms can be obtained as in the Math Figure 2. Accordingly, it can be understood the channel matrix has the orthogonality.

To obtain the diversity gain, it is preferable that the transmitting side transmits data through the other channels excepting channels that is neighboring on the time axis or frequency axis (that is, $h_{1,k}=h_{1,k+1}, h_{2,k}=h_{2,k+1}$ is not applied). But, if the data does not transmitted through the neighboring channels, the assumption that the channel environment is almost the same, that is, the assumption that $h_{1,k}=h_{1,k+1}, h_{2,k}=h_{2,k+1}$ can't be applied, so orthogonality can be satisfied.

Accordingly, to have orthogonality, the present embodiment proposes to calculate weight value form the previously estimated channel value, and apply it to the transmitting signals.

FIG. 3 is a flow chart that shows an example of a method for transmitting signals using weight value. Referring to the FIG. 3, base station receives signals from the MS, and performs channel estimation (S31). And, the base station calculates weight value using previously estimated channel value (S32), feedbacks the calculated weight value to each of the MSs (S33), and make each of the MSs transmit signals using the feedback information. The received signals applied the weight value can be represented as Math Figure 3.

$$\begin{bmatrix} r_k \\ r_{k+m} \end{bmatrix} = \begin{bmatrix} w_{11} \cdot h_{1,k} & w_{12} \cdot h_{2,k} \\ w_{21} \cdot h_{1,k+m} & -w_{22} \cdot h_{2,k+m} \end{bmatrix} \begin{bmatrix} s_1 \\ s_2 \end{bmatrix} + \begin{bmatrix} n_k \\ n_{k+m} \end{bmatrix} \quad \text{Math Figure 3}$$

When the base station calculates the w that make the channel matrix have the orthogonality and feedbacks the w the MS transmits ws that the weight value is applied. For example, the weight value can have the value as in Math Figure 4.

$$w_{11} = w_{12} = w_{21} = 1, w_{22} = \frac{h_{1,k}^* h_{2,k}}{h_{1,k+m}^* h_{2,k+m}} \quad \text{Math Figure 4}$$

In case of the Math Figure 4, the first MS transmits $s_1$ on 'k'-th time or 'k'-th frequency regardless of the feedback information, and transmits $s_1$ on 'k+m'-th time or 'k+m'-th frequency. And, the second MS transmits $s_2$ on 'k'-th time or 'k'-th frequency according to the feedback information, transmits $w_{22} \cdot s_2$ on 'k+m'-th time or 'k+m'-th frequency. Accordingly, each signals experience different channel, so the diversity gain can be obtained, and the orthogonality can be obtained by using the feedback information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can increase the transmission efficiency through obtaining both orthogonality and diversity gain in the multi-user MIMO system.

The invention claimed is:

1. A method for receiving signals in a multi-user system, the method comprising:
   receiving signals from a first mobile station and a second mobile station using a 'k'-th radio resource and a 'k+m'-th radio resource;
   estimating a channel matrix using the received signals;
   calculating weight values such that the channel matrix has orthogonality to the signals from each of the first and second mobile stations;
   transmitting the weight values to each of the first and second mobile stations; and
   receiving second signals from the first and second mobile stations, in which the weight values are applied by each of the first and second mobile stations,
   wherein the received second signals $r_k$ and $r_{k+m}$ are represented as follows:

$$\begin{bmatrix} r_k \\ r_{k+m} \end{bmatrix} = \begin{bmatrix} w_{11} \cdot h_{1,k} & w_{12} \cdot h_{2,k} \\ w_{21} \cdot h_{1,k+m} & -w_{22} \cdot h_{2,k+m} \end{bmatrix} \begin{bmatrix} s_1 \\ s_2 \end{bmatrix} + \begin{bmatrix} n_k \\ n_{k+m} \end{bmatrix},$$

and
   wherein $s_1$ represents a signal of the first mobile station and $s_2$ represents a signal of the second mobile station, $n_k$ and $n_{k+m}$ represent additive white Gaussian noise, and the weight values have the following values:

$$w_{11} = w_{12} = w_{21} = 1, \ w_{22} = \frac{h_{1,k}^* h_{2,k}}{h_{1,k+m}^* h_{2,k+m}}.$$

2. The method according to claim 1, wherein the radio resources are channels on a time axis.

3. The method according to claim 1, wherein the radio resources are channels on a frequency axis.

* * * * *